United States Patent [19]

Dochniak

[11] Patent Number: 5,354,807
[45] Date of Patent: Oct. 11, 1994

[54] ANIONIC WATER DISPERSED POLYURETHANE POLYMER FOR IMPROVED COATINGS AND ADHESIVES

[75] Inventor: Michael J. Dochniak, Ramsey, Minn.

[73] Assignee: H. B. Fuller Licensing & Financing, Inc., Arden Hills, Minn.

[21] Appl. No.: 101,430

[22] Filed: Aug. 3, 1993

Related U.S. Application Data

[63] Continuation-in-part of Ser. No. 825,025, Jan. 24, 1992, abandoned.

[51] Int. Cl.$^5$ ............................................. C08L 75/04
[52] U.S. Cl. ...................................... 524/591; 528/61
[58] Field of Search ........................... 524/591; 528/61

[56] References Cited

U.S. PATENT DOCUMENTS

| | | | |
|---|---|---|---|
| 3,169,949 | 2/1965 | Büning | 524/476 |
| 3,479,310 | 11/1969 | Dieterich et al. | 524/813 |
| 3,705,164 | 12/1972 | Honig et al. | 521/159 |
| 3,832,333 | 8/1974 | Chang et al. | 524/476 |
| 3,867,171 | 2/1975 | Ellsworth | 525/202 |
| 3,870,684 | 3/1975 | Witt et al. | 525/97 |
| 4,066,591 | 1/1978 | Scriven et al. | 528/67 |
| 4,092,286 | 5/1978 | Noll et al. | 524/206 |
| 4,108,814 | 8/1978 | Reiff et al. | 524/821 |
| 4,147,679 | 4/1979 | Scriven et al. | 524/297 |
| 4,190,566 | 2/1980 | Noll et al. | 525/482 |
| 4,203,883 | 5/1980 | Hangauer, Jr. | 524/222 |
| 4,254,201 | 3/1981 | Sawai et al. | 524/521 |
| 4,277,380 | 7/1981 | Williams et al. | 525/800 |
| 4,501,852 | 2/1985 | Markusch et al. | 524/521 |
| 4,540,633 | 9/1985 | Kucera et al. | 524/297 |
| 4,574,147 | 3/1986 | Meckel | 528/67 |
| 4,576,987 | 3/1986 | Crockatt et al. | 526/207 |
| 4,623,592 | 11/1986 | Duadé et al. | 524/521 |
| 4,636,546 | 1/1987 | Chao | 525/97 |
| 4,663,337 | 5/1987 | Das et al. | 528/83 |
| 4,711,935 | 12/1987 | Gmoser et al. | 525/97 |
| 4,762,880 | 8/1988 | Leung | 528/67 |
| 4,791,168 | 12/1988 | Salatin et al. | 524/476 |
| 4,801,644 | 1/1989 | Coogan | 524/297 |
| 4,851,459 | 7/1989 | Ramalingam | 524/222 |
| 4,870,129 | 9/1989 | Henning et al. | 528/83 |

(List continued on next page.)

FOREIGN PATENT DOCUMENTS

| | | |
|---|---|---|
| 673432 | 4/1966 | Belgium . |
| 764009 | 7/1967 | Canada . |
| 928323 | 6/1973 | Canada . |
| 0237997A1 | 3/1987 | European Pat. Off. . |
| 0296098A2 | 6/1988 | European Pat. Off. . |
| 222289A3 | 7/1988 | European Pat. Off. . |

(List continued on next page.)

OTHER PUBLICATIONS

Aqueous Polyurethane Dispersions From TMXDI® (META) Aliphatic Isocyanate Dated Feb. 1989.

NIAX® Performance Polyether Polyol PWB-1200 (From Union Carbide Corporation).

m- and p-TMXDI: Two New Isocyanates For The Polyurethane Industry, Volker D. Arendt, Raymond E. Logan and Robert Saxon, *Journal of Cellular Plastics,* Nov./Dec. 1982.

The Development of New Aqueous Polyurethane Dispersions for Coatings, Christopher N. Ryan and Mi- (List continued on next page.)

*Primary Examiner*—Maurice J. Welsh
*Attorney, Agent, or Firm*—Vidas Arrett & Steinkraus

[57] ABSTRACT

Improved anionic water dispersible polyurethanes are disclosed. Polyurethane-urea polymers in aqueous dispersion are obtained by chain extending an NCO-containing prepolymer in aqueous medium. The NCO-containing prepolymer is prepared by reacting a polyisocyanate with an active hydrogen-containing compound such as a polyol and dimethylolpropionic acid (DMPA) to form a pre-prepolymer and to this is added a diamine monomer containing a pendant aliphatic, to form the prepolymer which is then dispersed in water and chain extended. The improved anionic water dispersible polyurethane polymers of the invention form excellent coatings and adhesives.

27 Claims, No Drawings

U.S. PATENT DOCUMENTS

| | | | |
|---|---|---|---|
| 4,876,308 | 10/1989 | Melby et al. | 525/720 |
| 4,883,694 | 11/1989 | Ramalingam | 525/183 |
| 4,895,894 | 1/1990 | Ruetman et al. | 524/207 |
| 4,921,842 | 5/1990 | Henning et al. | 524/207 |
| 4,923,756 | 5/1990 | Chung et al. | 528/67 |
| 4,954,389 | 9/1990 | Acharya et al. | 524/100 |
| 4,963,637 | 10/1990 | Barksby | 525/673 |
| 5,001,189 | 3/1991 | Fock et al. | 524/207 |
| 5,023,309 | 6/1991 | Kruse et al. | 524/801 |
| 5,039,732 | 8/1991 | Arora | 524/201 |

FOREIGN PATENT DOCUMENTS

| | | |
|---|---|---|
| 0315832A1 | 10/1988 | European Pat. Off. . |
| 0369389A1 | 11/1989 | European Pat. Off. . |
| 344912A3 | 7/1990 | European Pat. Off. . |
| 482761 | 1/1970 | Fed. Rep. of Germany . |
| 4109447A1 | 1/1992 | Fed. Rep. of Germany . |
| 4024567A1 | 2/1992 | Fed. Rep. of Germany . |
| 1443909 | 1/1965 | France . |
| WO92/02568 | 8/1991 | PCT Int'l Appl. . |
| 91/00630 | 10/1991 | PCT Int'l Appl. . |
| 92/00560 | 10/1992 | PCT Int'l Appl. . |

OTHER PUBLICATIONS chael J. Dochniak, Presented at the Water–Bourne, Higher Solids, and Powder Coatings Symposium Feb. 26–28, 1982.

Cody, "TMXDI® (META) Aliphatic Diisocyanate a Versatile Polyurethane Component," May 13, 1988 (Paper presented at the Polyurethane's Tommorrow conference in Milan, Italy), Summary and page 9.

Appendix A–"How emulsion polymer/isocyanate adhesives solve bonding problems," *RPN Technical Notebook*, Mar. 11, 1985.

ANIONIC WATER DISPERSED POLYURETHANE POLYMER FOR IMPROVED COATINGS AND ADHESIVES

BACKGROUND OF THE INVENTION

This is a continuation-in-part of U.S. patent application Ser. No. 07/825,025, filed Jan. 24, 1992, and assigned to the same assignee, now abandoned.

This invention relates to polyurethanes and more particularly to anionic water dispersed polyurethanes (PUD's) which are useful as coatings and adhesives due to their improved properties. For example, as an adhesive, the improved polyurethanes of this invention are particularly useful in laminating plastic films together as well as providing a general adhesive of improved properties.

Water dispersed polyurethanes generally are known in the art. For example, U.S. Pat. No. 4,066,591 to Scriven and Chang discloses water dispersible NCO prepolymers of the type to which the present invention is directed as an improvement therein. The subject matter of that patent is incorporated herein in its entirety by reference. U.S. Pat. No. 5,039,732 to Kartar S. Arora is similarly of interest and is incorporated hereby by reference as well. Other related patents of interest include U.S. Pat. No. 4,277,380 to East and Rogemoser; U.S. Pat. No. 4,576,987 to Crockett and Rimma, and U.S. Pat. No. 4,791,168 to Salatin et al, and U.S. Pat. No. 5,023,309 to Kruse, Crowley and Mardis, all of which relate to water dispersible polyurethanes and are also incorporated herein by reference.

SUMMARY OF THE INVENTION

This invention is concerned generally with a series of cosolvent-free anionic aqueous polyurethane dispersions containing a special side chain functionality. The result is lower surface energy of the polymer in both the dispersion state and the dried film state. The new polyurethane dispersions of the invention have enhanced adhesion to plastics. Experiments have shown that side chain functionality is more effective in altering surface properties than the same functionality in the main chain.

According to this invention, it has been discovered that the incorporation of a diamine monomer containing a pedant aliphatic chain of the general formula

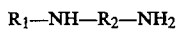

where
$R_1$ = a long aliphatic chain ($C_{12}$–$C_{22}$) which may include an alkoxy
$R_2$ = any alkyl chain.
and more specifically for example, N-isodecyloxypropyl-1,3-diaminopropane, an ether amine which is cyanoethylated and reduced of the formula

$R_1$ = branched or linear aliphatic chain ($C_{10}$) also known as Tomah DA-14, obtained from Exxon Chemicals, Inc. into an anionic polyurethane will improve the properties of the polyurethane as an adhesive and/or coating. For coatings, Tomah DA-14 is a preferred additive, although any variety of these compounds having $R_1$ (chain lengths) of about 12 to about 22 carbon atoms may be used, 12 to 18 lengths being preferred. The term pendant is used herein to indicate that the hydrophobic group extends (linear or branching) from the polymer chain rather than being totally incorporated into the polymer chain or backbone.

When compared to identical anionic polymers which do not include the aforementioned diamine monomer containing a pendant aliphatic chain, the polymers of this invention are found to provide improved hardness, lower surface tensions, better contact angles, tensile strength and adhesion to substrates, lower moisture vapor transition rates and better film appearance as coatings.

As known in this art, the intrinsic viscosity of a polyurethane product is an indication of molecular weight. In the case of the present invention, if the improved polyurethane is to be used as an adhesive, a soft material is usually desired. If use is to be as a coating, a hard material may be desired. Control of this aspect of the invention is within the skill of the established polyurethane art and need not be described in detail herein.

DETAILED DESCRIPTION

The polyurethanes of the present invention are dispersible in aqueous medium. In general, in a preferred form, an NCO-containing pre-prepolymer is prepared by reacting an organic polyisocyanate, an active hydrogen-containing compound, such as a polyol, for example dimethylolpropionic acid and a tertiary amine, e.g., triethylamine. This pre-prepolymer is then chain extended with a diamine monomer containing a pendant aliphatic chain, as disclosed above, to form a prepolymer having a pendant functionality as defined above, which may be linear or branched. The prepolymer is then dispersed in water and further chain extended with water soluble organic amine(s) to provide a water dispersed anionic polymer.

ORGANIC POLYISOCYANATE

The organic polyisocyanate which is used is most preferably tetramethyl xylene diisocyanate (TMXDI). However, the polyisocyanate can be an aliphatic or an aromatic polyisocyanate or a mixture of the two. Aliphatic polyisocyanates are preferred since it has been found that these provide better color stability in the resultant coating and are less reactive with water during chain termination or extension. Also diisocyanates are preferred although higher polyisocyanates can be used in place of or in combination with diisocyanates and/or monoisocyanates. Ordinarily, the average functionality of the reactants used in making the NCO-containing prepolymer is important in controlling the tendency of the prepolymer to gel. Where higher functionality polyisocyanates are used, some monofunctional isocyanate may be included to reduce the average functionality if desired. Examples of suitable higher polyisocyanates are 1,2,4-benzene triisocyanate and polyethylene polyphenyl isocyanate. Examples of suitable monoisocyanates are cyclohexyl isocyanate, phenyl isocyanate and toluene isocyanate. Examples of suitable aromatic diisocyanate are methane-his (4-phenyl isocyanate) and toluene diisocyanate. Examples of suitable aliphatic diisocyanate are straight chain aliphatic diisocyanate such as 1,4-tetramethylene diisocyanate and 1,6-hexamethylene diisocyanate. Also, cycloaliphatic diisocyanate can be employed. Examples include 1,4-cyclohexyl diisocyanate, isophorone diisocyanate, alpha, alpha-xylylene diisocyanate and 4,4'-methylene-bis(cyclohexyl isocyanate). Substituted organic polyisocyanates can also be used in which the substituents are nitro, chloro, alkoxy and other groups which are not reactive with hydroxyl groups or active hydrogens and provided the substituents are not positioned to render the isocyanate group unreactive. Examples include compounds having the structure:

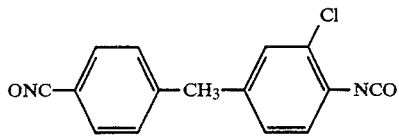

and

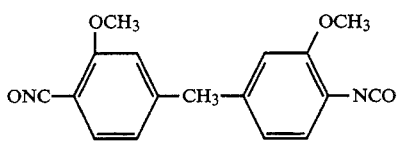

There can also be employed isocyanate-terminated abducts of diols and polyols such as propylene glycol, 1,4-butylene glycol, hydrophobic polyalkylene glycol and the like. These are formed by reacting more than one equivalent of the diisocyanate, such as those mentioned with one equivalent of diol or polyalcohol to form a diisocyanate product.

Thioisocyanates corresponding to the above-described can be employed as well as mixed compounds containing both an isocyanate and a thioisocyanate group. The terms "polyisocyanate" and "diisocyanate", as used in the present specification and claims, are intended to cover compounds and adduct containing thioisocyanate groups or isocyanate groups and compounds and adduct containing both isocyanate and thioisocyanate groups.

ACTIVE HYDROGEN-CONTAINING COMPOUND

Any suitable hydrophobic organic compound or compounds containing active hydrogens may be used for reaction with the organic polyisocyanate to form the partially reacted NCO-containing pre-prepolymers of the invention. Preferably, one will be used which results in the formation of NCO-terminated pre-prepolymers as are shown in the Examples hereinbelow. NCO-terminated are the preferred NCO-pre-prepolymers of this invention. Active hydrogens include hydrogen atoms attached to oxygen, nitrogen, or sulfur, and thus useful compounds will include those having at least two of these groups (in any combination) —OH, —SH,

and —NH. The moieties attached to each group can be aliphatic, aromatic, cycloaliphatic or of a mixed type not including carbonyl, phosphoryl or sulfonyl linkages.

Examples of such compounds include amines, which includes polyamines, aminoalcohols, mercapto-terminated derivatives, and alcohols, which includes polyhydroxy materials (polyols) which are preferred because of the ease of reaction they exhibit with polyisocyanates. Alcohols and amines generally give no side reactions, giving higher yields of urethane (or urea) product with no by-product and the products are hydrolytically stable. Also, with regard to polyols, there are a wide variety of materials available which can be selected to give a wide spectrum of desired properties. In addition, the polyols have desirable reaction rates with polyisocyanates. Both saturated and unsaturated active hydrogen-containing compounds can be used, but saturated materials are preferred because of superior coating properties.

Water soluble amines which can be employed in the preparation of the urethanes of the invention can be primary or secondary diamines or polyamines in which the radicals attached to the nitrogen atoms can be saturated or unsaturated, aliphatic, alicyclic, aromatic, aromatic-substituted aliphatic, aliphatic-substituted aromatic or heterocyclic. Mixed mines in which the radicals are different such as, for example, aromatic and aliphatic can be employed and other non-reactive groups can be present attached to the carbon atom, such as oxygen, sulfur, halogen or nitroso. Exemplary of suitable water soluble aliphatic and alicyclic diamines are the following: 1,2-ethylene diamine, 1,2-propylene diamine, 1,8-menthane diamine, isophorone diamine, propane-2,2-cyclohexyl amine, methane-bis-(4-cyclohexylamine),and

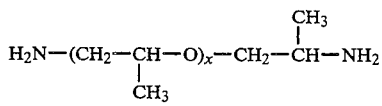

wherein x=1 to 10.

Aromatic diamines such as the phenylene diamines and the toluene diamines can be employed. Exemplary of the aforesaid amines are: o-phenylene diamine and p-tolylene diamine. N-alkyl and N-aryl derivatives of the above amines can be employed such as, for example, N,N'-dimethyl-o-phenylene diamine, N,N'-di-p-tolyl-m-phenylene diamine, and p-aminodiphenylamine.

Polynuclear aromatic diamines can be employed in which the aromatic rings are attached by means of a valence bond such, as, for example, 4,4-biphenyl diamine, methylene diamine and monochloromethylene diamine.

Aminoalcohols, mercapto-terminated derivatives and mixtures, and the like, hydroxy acids and amino acids can also be employed as the active hydrogen compounds. Examples are monoethanolamine, 4-aminobenzoic acid, aminopropionic acid, N-(hydroxyethyl) ethylene diamine, 4-hydroxybenzoic acid, p-aminophenol, dimethylol propionic acid, hydroxy stearic acid, and beta-hydroxypropionic acid. When amino acids are used, additional basic material should also be present to release NCO-reactive mines from Zwitterion complexes.

The active hydrogen-containing compound can, if desired, contain functional moieties which are capable of further reaction to aid in the cure of the product. Examples would be active hydrogen-containing compounds which contain acrylic unsaturation which enables the coating to be cured by ultraviolet light with vinyl monomers.

The polyhydroxyl materials or polyols can be either low or high molecular weight materials and in general will have average hydroxyl values as determined by ASTM designation E-222-67, Method B, between about 1000 and 10, and preferably between about 500 and 50.

The term "polyol" is meant to include materials having an average of two or more hydroxyl groups per molecule.

The polyols include low molecular weight diols, triols and higher alcohols, low molecular weight amide-containing polyols and higher polymeric polyols such as polyester polyols, hydrophobic polyether polyols and hydroxy-containing acrylic interpolymers. The low molecular weight diols, triols and higher alcohols useful in the instant invention are known in the art. They have a hydroxy value of 200 or above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphic polyols such as 1,2-cyclohexanediol and cyclohexane dimethanol. Examples of triols and higher alcohols include trimethylol propane, glycerol and pentaerythritol. Also useful are polyols containing ether linkages such as diethylene glycol and triethylene glycol and oxyalkylated glycerol.

Also useful are low molecular weight amide-containing polyols having hydroxyl values of 100 or above. When these low molecular weight amide-containing polyols are incorporated into the polymer, they enhance its water dispersability.

Where flexible and elastomeric properties are desired, the partially reacted NCO-containing prepolymer should preferably contain at least a portion of a higher molecular weight polymeric polyol. Such a polymeric polyol should be predominantly linear (that is, absence of low functional or higher functionality ingredients) to avoid gelling of the resultant polymeric product and should have a hydroxyl value of 200 or less, preferably within the range of about 150 to 30.

The most suitable polymeric polyols include hydrophobic polyalkylene ether polyols including thiol ethers, polyester polyols including polyhydroxy polyesteramides and hydroxyl-containing polycaprolactones and hydroxy-containing acrylic interpolymers.

Any suitable hydrophobic polyalkylene ether polyol may be used including those which have the following structural formula:

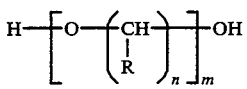

where the substituent R is a lower alkyl including mixed substituents, and n is typically from 2 to 6 and m is from 2 to 100 or even higher. Included are poly(oxytetramethylene) glycols and the reaction products of ethylene glycol and a mixture of propylene oxide and ethylene oxide.

Also useful are polyether polyols formed from the oxyalkylation of various polyols, for example, glycols such as propylene glycol, 1,6-hexanediol, Bisphenol A, and the like, or higher polyols, such as trimethylol propane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, propylene oxide, in the presence of an acidic or basic catalyst.

Besides hydrophobic poly(oxyalkylene) glycols, any suitable polyhydric polythioether may be used such as, for example, the condensation product of thioglycol or the reaction product of polyhydric alcohol, such as disclosed herein for the preparation of hydroxyl polyesters, with thioglycol or any other suitable glycol.

Polyester polyols can also be used as a polymeric polyol component in the practice of the invention. The polyester polyols can be prepared by the polyesterification of organic polycarboxylic acids or anhydrides thereof with organic polyols. Usually, the polycarboxylic acids and polyols are aliphatic or aromatic dibasic acids and diols.

The diols which are usually employed in making the polyester include alkylene glycols, such as ethylene glycol and butylene glycol, neopentyl glycol and other glycols such as hydrogenated Bisphenol A, cyclohexane diol, cyclohexane dimethanol, caprolactone diol (for example, the reaction product of caprolactone and ethylene glycol), hydroxyalkylated bisphenols, polyether glycols, for example, poly(oxytetramethylene) glycol and the like. However, other diols of various types and, as indicated, polyols of higher functionality can also be utilized. Such higher polyols can include, for example, trimethylol propane, trimethylol ethane, pentaerythritol, and the like, as well as higher molecular weight polyols such as those produced by oxyalkylating low molecular weight polyols.

As has been mentioned above, some monofunctional alcohol such as n-propyl alcohol and n-butyl alcohol can be used.

The acid component of the polyester consists primarily of monomers carboxylic acids or anhydrides having 2 to 18 carbon atoms per molecule. Among the acids which are useful are phthalic acid, isophthalic acid, terephthalic acid, tetrahydrophthalic acid hexahydrophthalic acid, adipic acid, azelaic acid, sebacic acid, maleic acid, glutaric acid, chlorendic acid, tetrachlorophthalic acid and other dicarboxylic acids of varying types. The polyester may include minor amounts of monobasic acid, such as benzoic acid, stearic acid, acetic acid, hydroxy stearic acid and oleic acid. Also, there may be employed higher polycarboxylic acids such as trimellitic acid and tricarboxylic acid. Where acids are referred to above, it is understood that the anhydrides of those acids which form anhydrides can be used in place of the acid. Also, lower alkyl esters of acids such as dimethyl glutarate can be used.

Besides polyester polyols formed from polybasic acids and polyols, polycaprolactone-type polyesters can also be employed. These products are formed from the reaction of a cyclic lactone such as epsilon-caprolactone with a polyol or a hydroxy acid. Such products are described in U.S. Pat. No. 3,169,949 to Hostettler, the portion of this patent relating to the description of polycaprolactone polyols being incorporated by reference. Although not disclosed in the aforementioned patent, the product of cyclic lactone with an acid-containing polyol can also be used. The reaction of urea and caprolactone such as described in U.S. Pat. No. 3,832,333 to Chang et al can also be used.

While polyester polyols have been specifically disclosed, it is to be understood that useful products are also obtainable by substituting a polyesteramide polyol, or a mixture of polyesteramide polyols for part or all of the polyester polyol. The polyesteramide polyols are produced by conventional techniques from the above-described acids and diols, and minor proportions of diamines or aminoalcohols. Suitable diamines and aminoalcohols include hexamethylene diamine, hydrazine, bis(4-aminocyclohexyl) methane, diethylene triamine, ethylene diamine, ethanolamine, phenylene diamine, toluene diamine and poly(amide-amines) and the like. It is to be understood that the polyester polyols of the instant invention include such polyesteramide polyols.

In addition to the higher molecular weight polyether and polyester polyols, hydroxy-containing acrylic interpolymers can also be employed.

The higher polymeric polyol component may be combined with the low molecular weight polyol described above. It has been found that by blending high and low molecular weight polyols, optimum properties can be obtained in the resultant NCO-containing prepolymer. Preferably, the polymeric polyol is the major component, being present in an amount of about 25 to 95 percent by weight based on total weight of the polyol used to prepare the NCO-containing prepolymer, the remainder being low molecular weight polyol.

The partially reacted NCO-containing pre-prepolymer and the prepolymer formed therefrom will contain salt groups such as acid salt groups which can be selected from the class consisting of $-OSO_3-$, $-OPO_3=$, $COO-$, $SO_2-$, $POO-$ and $PO_3=$. The pre-prepolymer will be prepared with reactants containing the acid salt group, or it can be prepared with free acid groups which can be subsequently neutralized after prepolymer formation. Suitable materials for introducing acid groups into the partially reacted NCO-containing pre-prepolymer are materials which contain at least one active hydrogen atom reactive with isocyanate groups or at least one isocyanate group, and at least one group capable of salt formation. Preferably, the acid group is in the active hydrogen material because isocyanates containing acid groups are not stable.

Specific examples of compounds which contain active hydrogens and acids groups capable of salt formation are hydroxy and mercapto carboxylic acid. Examples include dimethylol propionic acid, glycollic acid, thioglycollic acid, lactic acid., malic acid, dihydroxy malic acid, tartaric acid, dihydroxy tartaric acid, and 2,6 dihydroxybenzoic acid. Other examples of compounds which contain active hydrogens and acid groups are aminocarboxylic acids, aminohydroxy carboxylic acids, sulfonic acids, hydroxy sulfonic acids and aminosulfonic acids. Examples include oxaluric acid, anilido acetic acid, glycine, alpha-alanine, 6-amino caproic acid, reaction product of ethanolamine and acrylic acid, hydroxy ethyl propionic acid, 2-hydroxyethane sulfonic acid and sulphanilic acid. Other examples include bis-hydroxymethylphosphinic acid, trimethylol propane monophosphate and monosulfate, N-hydroxyethylaminomethylphosphonic acid.

Suitable salt forming agents for acid group containing compounds include inorganic and organic bases such as sodium hydroxide, potassium hydroxide, ammonia and tertiary amines.

Anionic solubilizing groups (i.e., salt groups) as described above, must be incorporated into the polymer and are the primary dispersing and solubilizing mechanisms.

CONTAINING A PENDANT ALIPHATIC CHAIN

The diamine monomer containing a pendant aliphatic chain additive of the invention will consist of a long aliphatic chain attached to one of two amine groups which are capable of reacting with isocyanates. The general structure is:

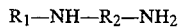

$$R_1-NH-R_2-NH_2$$

and wherein $R_1$ = a long aliphatic chain which may be aliphatic (saturated/unsaturated branched/linear), and is derived from a fat oil or petroleum source, $R_1$ may also contain an alkoxy and $R_2$ = any alkyl chain.

$R_1$ may be in any length from 12 to a 22 carbon atoms. Longer chains impact greater hydrophobicity to the polymer. Longer chains may be used to promote phase separation within the polymer matrix, thereby imparting toughness. Shorter chains 12-18 carbons are generally preferred for clear coatings. The urea linkages allow for more hydrogen bonding with the polymer matrix for increased hardness, chemical resistance, and heat resistance.

Improvements in film properties occur with levels of diamine monomer containing a pendant aliphatic chain as low as 1% by weight. Certain properties such as hardness, lower surface tension, adhesion to lower energy surfaces, MVTR, and tensile strength will change with the level of pendant aliphatic diamine monomer. Depending on what properties the particular application calls for, levels of diamine monomer containing a pendant aliphatic chain of 5%-15% by weight are generally preferred. For example, one property desirable in coatings is water repellency which is related to the hydrophobic character of the coating; the higher the hydrophobic character, the more repellant the coating. Experimentation has shown that pendant aliphatics in the polymer will also decrease surface tension slightly. Examples of preferred diamine monomers containing a pendant aliphatic chain which may be used in the invention are:

N-Coco-1,3-diaminopropane
N-tallyl-1,3-diaminopropane
N-oleo-1,3-diaminopropane
N-lauryl-1,3-diaminopropane
N-isodecyloxypropyl-1,3-diaminopropane (Tomah DA-14 from Exxon)
N-isotridecyloxypropyl-1,3-diaminopropane (Tomah DA-17 from Exxon)
N-alkyl-1,3-diaminopentane (DuPont)
N-isotridecyloxypropyltriamine (Tomah TA-17 from Exxon)

Long aliphatic diamine monomers improve polymer properties. These amines yield urea linkages upon reaction with isocyanates which in a polyurethane-urea increase resistance to heat, water and solvent while increasing hardness. This is due to both the urea bonds being stronger, more stable bonds than urethanes and enhanced hydrogen bonding between urea linkages and other polar linkages within the polymer. These improvements in polymer properties are in addition to improvements resulting from the long aliphatic moiety present in the polymer.

Long aliphatic diamine monomers will shorten polyurethane dispersion (PUD) preparation times due to the great speed with which the amine-isocyanate reaction occurs (i.e. nearly instantaneous). The time to prepare a PUD can be decreased significantly. The way to speed up PUD preparation is by making an isocyanate terminated pre-prepolymer having a high NCO/OH equivalent ratio, followed by reaction with the diamine monomer containing a pendant aliphatic chain to form the prepolymer. The NCO/OH equivalent ratio influences the rate at which the NCO—OH reaction occurs; higher ratios results in faster reaction times.

The pre-prepolymer is a small molecular weight NCO terminated oligomer which consists of the reaction product of a polyol, a diisocyanate and DMPA.

PREPARATION

The hydrogen-containing compound is first charged to a suitable reaction vessel, followed by the DMPA, the Triethylamine and the polyisocyanate components, and the mixture is heated if necessary until the isocyanate has completely reacted with the active hydrogens to produce an NCO-containing pre-prepolymer essentially free of active hydrogens as determined by the product having an essentially constant NCO equivalent. At this stage of reaction the diamine monomer containing a pendant aliphatic chain is added to the NCO-containing polyurethane preprepolymer to chain extend via urea linkage formation and provide a prepolymer with the pendant functionality. If desired, catalyst such as dibutyltin dilaurate, stannous octoate and the like may be employed to accelerate the reaction. The reaction forming the prepolymer may take from several minutes to several days, depending on the reactivity of the reactants, temperature, presence or absence of catalyst and the like. The resultant prepolymer is then dispersed in water and chain extended with water soluble diamines or triamines.

The organic polyisocyanate is employed in an amount sufficient to react with the desired amount of the active hydrogen-containing components so as to produce an NCO-containing prepolymer. The preferred equivalent ratio of NCO/OH typically about 1.3 to about 2.5. To make a high molecular weight thermoplastic material, i.e., 10,000 or more, reaction should be completed so that substantially all the active hydrogen material is used up and the resulting NCO-prepolymer is substantially free of highly active hydrogen. By the expression "substantially free of active hydrogen" is meant the resultant NCO-prepolymer is substantially free of active hydrogen associated with materials charged to the reaction mixture for the purpose of reacting with isocyanates to form urethanes, thiourethanes and ureas, that is, —OH, SH, =NH, —NH$_2$. Not included within the expression "highly active hydrogen" are the urethane, thiourethane and urea hydrogens formed in the NCO-prepolymer forming reaction, or any hydrogens associated with salt formation (e.g. acid groups). The determination that the product is substantially free of highly active hydrogen is made when reaction is complete and the fully reacted product has an essentially constant NCO equivalent.

For elastomeric coatings, a high molecular weight polyester or a hydrophobic polyether polyol should be present in the prepolymer formulation and constitute at least 20 percent by weight of the prepolymer based on total weight of the prepolymer reactants. Preferably, about 25 to 80 percent by weight of the polymeric polyol should be employed in order to get optimum elastomeric properties.

To obtain somewhat harder elastomeric coatings, the pre-prepolymer formulation can be varied by the incorporation of a low molecular weight active hydrogen-containing compound such as a diol into the formulation. In general the low molecular weight, active hydrogen-containing compound will be present in amounts up to 50 percent by weight of the prepolymer, preferably about 2 to 35 percent by weight based on total weight of the prepolymer reactants.

To form a finely divided, stable dispersion, the NCO-containing prepolymer should be within the viscosity range of 50–10,000 and preferably from 100 to 5000 centipoises. Polymers within this viscosity range are easy to disperse, requiring only mild agitation. Polymers with viscosities higher than 10,000 centipoises are difficult to disperse even with higher shear agitation equipment because large or very course dispersions are formed which are usually coarse and sedimenting.

The amount of aqueous medium employed in the formulations of the dispersions of the present invention is important. When too little amount of aqueous medium is employed, mixtures are obtained which are often too thick to handle easily while, on the other hand, dispersions which are too dilute are uneconomical to handle due to their excessive volume. In general, the aqueous medium will amount to 15 to 80 percent by weight, preferably about 20 to 70 percent by weight based on total weight of the polymer and the aqueous medium.

The term "dispersion" as used herein refers to a two-phase, translucent, aqueous polyurethane system in which the polyurethane is the dispersed phase. In determining particle size the polyurethane is dispersed and then thinned with water to form less than one percent solids dispersion. According to the invention, the average particle size diameter will be less than about 5 and preferably less than about 1.5, and most preferably about 0.2 micron or even less, as determined by light scattering. The particles may be spherical or elongated or invisible by microscopic investigation. The dispersions are generally only suitable if the particle size does not exceed about 5 microns. Small particle size dispersions are advantageous because they are non-sedimenting and have a high surface energy associated with them. This results in a strong driving force for coalescing and in coatings having surprisingly fast drying times. The term "dispersion" is also intended to cover homogeneous aqueous solutions which appear optically clear.

In the specification and claims, where the term "polyurethane" has been used, it is intended to cover not only polycondensates of polyisocyanates and polyols, but also the condensates of polyisocyanates with any active hydrogen-containing material mentioned above. Thus, the term "polyurethane" is defined as any polymer containing two or more urethane groups and is also intended to cover polyureas and polythiourethanes.

The NCO-containing prepolymer can be dispersed in a number of ways. Preferably, the prepolymer, whether neat or as a solution, is added incrementally to the aqueous dispersing medium with agitation. Alternately, the aqueous dispersing medium can be added incrementally to the prepolymer with stirring. However, this latter method is less preferred because commonly upon initial addition of the dispersing medium, a high viscosity grease-like material results. The main disadvantage associated with this grease-like viscosity is that it is very hard to include additional water. Without efficient stirring, there is a definite possibility of forming gel particles. By adding the prepolymer to water, this high initial viscosity is avoided.

HYDROPHILIC CHAIN EXTENDERS

Usually after the salt form of the prepolymer has been dispersed, a hydrophilic water soluble chain extender is added to the dispersion fairly quickly as opposed to the hydrophilic chain extenders used in forming the prepolymer. The prepolymer reacts with water at a slow rate depending upon the reaction mixture. The time after the prepolymer has been added to water and before chain extender is added will determine how much of the water reacts with the prepolymer. The temperature of the dispersion will also have an effect on how much reaction occurs. Change in temperature and time will result in different products. In order to obtain reproducible results, the time, temperature and amount of chain extender should be rigidly controlled. The time and temperature is important in determining the type of final product. Chain extenders build molecular weight of the dispersed prepolymer whereas chain terminators react with the NCO groups and prevent them from further reacting with water and gelling the resultant resin. The chain extender can be defined as an active hydrogen-containing compound having at least two hydrogens more reactive with NCO groups than water is. Examples of suitable classes of chain extenders are ammonia, primary and secondary organic amines, preferably diamines, hydrazine, substituted hydrazines and hydrazine reaction products and certain organic polyols. Organic diamines are often the preferred chain extenders because they usually build the highest molecular weight without gelling the resin, provided of course, the ratio of amino groups to isocyanate groups is properly controlled. The amount of chain extender depends on its functionality, on the NCO content of the prepolymer and on the extent of the reaction. The ratio of active hydrogen groups in the chain extender to NCO groups in the prepolymer should be less than about 2:1, preferably from about 0.5 to about 1.75:1.

Special note should be made of chain extenders which also introduce functional groups into the final polymer structure so as to make the final polymer further reactive with material such as curing agents or the like. Examples of such chain extenders are alkanol amines such as N-aminoethylethanolamine, ethanolamine, diethanolamine, aminopropyl alcohol, 3-aminocyclohexyl alcohol, para-aminobenzyl alcohol and the like. Compounds of this type introduce hydroxyl functionality into the final polymer product. Examples of other compounds which introduce functionality into the final polymer product are carboxylic acid-containing amines such as lysine or lysine hydrochloride, glutamic acid, glycine, alanine, reaction product of ethylene diamine and acrylic acid which would introduce carboxyl functionality into the final polymer product. Use of carboxyl-containing chain extenders can also be used in instances where acid salt-containing prepolymer is only marginally dispersible. In this instance, the carboxyl-containing amine chain extender could be the same kind and when used to chain extend the prepolymer, would enhance the dispersibility of the final polymer product.

Examples of suitable chain extenders other than those mentioned specifically above are the following ethylene diamine, propylene diamine, butylene diamine, hexamethylene diamine, cyclohexylene diamine, phenylene diamine, tolylene diamine, xylylene diamine, 3,3 dichlorobenzidene, 4,4 methylene-bis(2-chloroaniline), 3,3-dichloro-4,4-diamino diphenylmethane, and adduct of diethylene triamine with acrylate or its hydrolyzed products. Also materials such as hydrazine, substituted hydrazines such as, for example, dimethyl hydrazine, 1,6-hexamethylene bis-hydrazine, carbodihydrazide, hydrazides of dicarboxylic acids and sulfonic acids such as adipic acid mono-or dihydrazide, tartaric acid dihydrazide, 1,3 phenylene disulfonic acid dihydrazide, omega-amino-capronic acid dihydrazide tartaric acid dihydrazide, hydrazides made by reacting lactones with hydrazine such as gamma-hydroxybutyric hydrazide, bis-semi-carbazide, bis-hydrazide carbonic esters of glycols such as any of the glycols mentioned above. Also, hydroxyl-containing compounds such as hydroxyl-containing polyesters and alkyds may be employed.

The final chain extended polymer dispersed in water should have a viscosity of about 10 to about 50,000, and preferably from about 20 to about 20,000 centipoises in order to be easily handled and should have a solids content of about 20 to about 80 percent. As mentioned earlier, dispersion should be stable and can be essentially emulsifier free. The particle size of the dispersed phase when measured as described above at one percent solids is less than about 5, preferably less than about 1.5, and most preferably about 0.2 micron or less, and the particles may be spherical or elongated.

POLYMER CROSSLINKING

The chain extended polymer may be crosslinked further to increase solvent, water, or heat resistance or hardness. This may be done using a one part or two part approach. In a one part approach, a latent chemical reaction is utilized which will take place upon exposure to heat, oxygen, radiation or simply evaporation of water. A two part system begins to cure upon blending of the polyurethane dispersion with the crosslinking agent. The adhesive or coating must be used before the reaction proceeds to the extent that desirable properties are diminished like ease of application or adhesion.

Crosslinking agents which are useful for polyurethane dispersions include epoxies, polyisocyanates or masked polyisocyanates, aziridines, carbodiimides, amines or masked amines like ketimines, formaldehyde or masked formaldehyde, methylolethers, uretediones; free redical initiators like peroxides or azo compounds, and metal complexes. The choice of crosslinking agent depends on a number of factors including the chemical functional groups in the polyurethane, rate of crosslinking desired, safety of the chemical, ability to coalesce with the polyurethane and reactivity towards water.

Several methods are available to accelerate cure in the case of a two component system or initiate the latent reaction in the case of one component system. These include heat from a convection oven, ultrasonics, electromagnetic induction, radiofrequency, microwave, ultraviolet radiation, electron beam radiation, and oxidation by atmospheric oxygen.

OPTIONAL INGREDIENTS

In addition to the components mentioned above, the compositions of the invention may contain additional optional ingredients, including any of the various pigments ordinarily utilized in coatings or adhesives. In addition various fillers, plasticizer, anti-oxidants, flow control agents, thickeners, surfactants catalysts, solvents and other formulating additives may be employed. Although the products of the invention can be dispersed without the aid of conventional surfactants or emulsifying agents, it may be desirable in certain instances to add additional ingredients for the purpose of affecting the final properties of the composition.

APPLICATION

The compositions herein can be applied by any conventional method, including brushing, dipping, flow coating, electrodeposition, electrostatic spraying, and the like, but they are most often applied by air spraying. The usual spray techniques and equipment are utilized. The coatings and adhesives of the present invention can be applied over virtually any substrate, including wood, metals, glass, textiles, plastics, foam and the like, as well as over various primers. The compositions disclosed herein can be added to other water-compatible compositions to improve flexibility, hardness, drying and other coating properties. Typically there are no organic solvents used.

The following Examples are particularly useful as clear coatings.

EXAMPLE I

A reaction vessel was charged with 267.13 g (0.2671 eq) of a 2000 mw poly (Butanediol adipate), 31.6 g (0.4716 eq) dimethyloproprionic acid, 22.6 g triethylamine, 1.9 Irganox 1076 (an anti oxident obtained from Ciba Geigy, Hawthorne, N.Y.), 21.37 (0.071 eq) Rucoflex F-2310 (a polyol obtained from Ruco Chemical Co., Hicksville, N.Y.), and 245 g (2.008 eq) TMXDI. After 3 hours reaction time at 85° C. 63 g (.430 eq) Tomah DA-14 was charged over a 5 minute period. The resulting prepolymer was dispersed with 947.62 g water and chain extended with 4.8 g (0.141 eq) diethylenetriamine and 14.9 g (0.496 eq) ethylenediamine pH=7.7
Viscosity=40 centipoise
Particle size=85 nm
Clear colorless film

EXAMPLE II

A reaction vessel was charged with 268.52 g (0.5265 eq) a 2000 mw poly (Hexanediol adipate) 32.8 g (0.4895 eq) dimethyloproprionic acid, 23.5 g triethylamine, 3.28 g (0.073 eq) trimethylopropane, and 284 g (2.327 eq) TMXDI. After 3 hours reaction time at 85° C. 65.4 g (0.4479 eq) Tomah DA-14 was charged and the resulting prepolymer was dispersed with 1011 g water and chain extended with 4.8 g (0.141 eq) diethylenetriamine and 15.1 g (0.50 eq) ethylenediamine pH=8.0
Viscosity=70 centipoise
Particle size=77 nm
Aqueous film surface tension=43 dynes/cm

EXAMPLE III

A reaction vessel was charged with 291.3 g (0.2913 eq) a 2000 mw poly (butanediol adipate) 31.6 g (0.4716 eq) dimethyloproprionic acid, 22.6 g triethylamine, 1.9 Irganox 1076, 3.2 g 0.071 eq) trimethylopropane, and 245 g (2.00 eq) TMXDI. After 3 hours reaction time at 85° C. 63 g (430 eq) Tomah DA-14 was added and the resulting prepolymer was dispersed with 981.6 g water. This dispersion was chain extended with 4.9 g (0.144 eq) diethylenetriamine and 15.5 g (0.455 eq) ethylenediamine pH=8.2
Viscosity=130 centipoise
Particle size=87 nm
Dried film surface tension=35 dynes/cm (ACCU-DYNE TEST PENS)
Coefficient of friction=24° or 4452 (750 g weight)
Passed heat and humidity test (140 F. at 100% humidity after one week).
Cross hatch adhesion (Permacel tape)
Steel=100 % Adhesion
ABS=100%
Spectrum HF-85=92%
Lexan=100%
D-9000=99%

EXAMPLE IV

A reaction vessel was charged with 268.52 g (0.5265 eq) of a 2000 mw poly (butanediol adipate), 32.8 g (0.4895 eq) dimethyloproprionic acid, 23.5 g triethylamine, 3.28 g 0.073 eq) trimethylopropane, and 284 g (2.327 eq) TMXDI. After 3 hours at 85° C., 65.4 g (0.4479 eq) Tomah DA-14 was charged into the vessel and the resulting prepolymer was dispersed with 1013 g water and chain extended with 4.9 g (0.144eq) diethylenetriamine and 15.4 g (0.51 eq) ethylenediamine pH=8.0
Viscosity=410 centipoise
Particle size=85 nm
Shore D-hardness=80
Taber abrasion=38 mg loss
(H-18 wheels, 100 cycles, 1 kg weights.)
Dried film surface tension=35 dynes/cm
(Enercon solutions)
Aqueous surface tension=42 dynes/cm
Tensile strenght =4,400 psi
Elongation=700% strain
High gloss values=
20°=74.8
60°=90.2
85°=100

This completes the description of the preferred and alternate embodiments of the invention. Those skilled in the art may recognize other equivalents to the specific embodiments described herein which equivalents are intended to be encompassed by the claims attached hereto.

What is claimed is:

1. As an improved composition, particularly for use as a coating or an adhesive, an anionic water dispersable polyurethane of the type which is the reaction product of an active hydrogen-containing material and a polyisocyanate to form a pre-polymer which is then reacted with a quantity of a diamine monomer containing a pendant aliphatic chain to form an anionic prepolymer having a pendant functionality, the prepolymer being readily dispersible in water.

2. The composition of claim 1 wherein the diamine monomer containing a pendant aliphatic chain possesses functionality capable of reacting with isocyanates, the general structure of the diamine monomer containing a pendant aliphatic chain being $$R_1-NH-R_2-NH_2$$

where
$R_1$ = a long aliphatic chain ($C_{12}-C_{22}$) which may include an alkoxy
$R_2$ = any alkyl chain.

3. The composition of claim 2 wherein the amount of diamine monomer containing a pendant aliphatic chain in the prepolymer ranges from greater than 0% to about 50% by weight.

4. The prepolymer of claim 3 wherein the amount of the diamine monomer containing a pendant aliphatic chain ranges up to about 25% by weight.

5. The composition of claim 4 wherein the range of the diamine monomer containing a pendant aliphatic chain is from about 5% to about 15% by weight.

6. The composition of claim 1 wherein the amount of the diamine monomer containing a pendant aliphatic chain within the prepolymer is about 10% by weight.

7. The composition of claim 1 wherein the diamine monomer containing a pendant aliphatic chain is N-Coco-1,3-diaminopropane.

8. The composition of claim 7 wherein the amount of the diamine monomer containing a pendant aliphatic chain ranges from greater than 0 to about 20% by weight.

9. The composition of claim 8 wherein the amount ranges from about 10% to 15% by weight.

10. The composition of claim 1 wherein the diamine monomer containing a pendant aliphatic chain is a long chain aliphatic diamine.

11. The composition of claim 1 including an organic amine chain extender.

12. The composition of claim 11 wherein the organic amine has a functionality of 1 or greater.

13. The composition of claim 1 wherein the polyisocyanate is a diisocyanate and the active hydrogen-containing material includes a polyol.

14. The composition of claim 13 wherein the diamine monomer containing a pendant aliphatic chain is a long chain aliphatic diamine.

15. An aqueous dispersion of a polymer which is the reaction product of:
a. an NCO-containing pre-polymer formed from an active hydrogen-containing material reacted with a polyisocyanate, the pre-polymer then being reacted with a diamine monomer containing a pendant aliphatic chain of the general structure

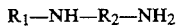

where
$R_1$ = a long aliphatic chain ($C_{12}$–$C_{22}$) which may include an alkoxy
$R_2$ = any alkyl chain
to form a prepolymer which is in turn reacted with
b. an active hydrogen-containing material in which the active hydrogen is more reactive with NCO groups than water to form a polyurethane polymer dispersed in water.

16. The polymer dispersion of claim 15 wherein the diamine monomer containing a pendant aliphatic chain is a long chain aliphatic diamine.

17. The monomer polymer dispersion of claim 15 wherein the diamine monomer containing a pendant aliphatic chain ranges in amount from greater than zero to about 50% by weight of the prepolymer.

18. The polymer dispersion of claim 15 wherein the amount of the diamine monomer containing a pendant aliphatic chain ranges from about 8% to about 15% by weight in the prepolymer.

19. The polymer dispersion of claim 15 wherein the diamine monomer containing a pendant aliphatic chain is N-isodecyloxy propyl-1,3-diaminopropane.

20. The polymer dispersion of claim 15 wherein the polyisocynate is a diisocyanate.

21. The polymer dispersion of claim 15 wherein the diisocyanate is tetramethylxylene diisocyante (TMXDI).

22. The polymer dispersion of claim 15 wherein the active hydrogen-containing material comprises a polyol.

23. The polymer dispersion of claim 15 wherein the second mentioned active hydrogen-containing material comprises an organic amine.

24. The polymer dispersion of claim 15 wherein the diamine monomer containing a pendant aliphatic chain has a functionality of 2 or greater.

25. The polymer dispersion of claim 22 wherein the polyol is a butanediol adipate polyester polyol and there is included for the first mentioned reaction tetramethylxylene diisocyante (TMXDI) and an amount of 2,2-dimethylol propionic acid (DMPA) and an amount of triethylamine.

26. The polymer dispersion of claim 22 wherein the polyol is butanediol adipate polyester polyol and there is included for the first mentioned reaction tetramethylxylene diisocyante (TMXDI) and an amount of N-isodecyloxy propyl-1,3-diaminopropane, an amount of 2,2-dimethylol propionic acid (DMPA) and an amount of triethylamine.

27. A polyurethane which comprises the reaction product of a pre-prepolymer formed by reacting a polyisocyanate with an active hydrogen-containing compound, the pre-prepolymer then being reacted with a diamine monomer containing a pendant aliphatic chain to form a prepolymer having a pendant functionality.

* * * * *

UNITED STATES PATENT AND TRADEMARK OFFICE
CERTIFICATE OF CORRECTION

PATENT NO. : 5,354,807
DATED : October 13, 1994
INVENTOR(S) : Michael J. Dochniak It is certified that error appears in the above-indentified patent and that said Letters Patent is hereby corrected as shown below:

Col. 1, line 46, delete "pedant" and insert -- pendant --

Col. 4, line 16, delete "mines" and insert - amines --

Col. 8, line 21, delete "pendant aliphatic diamine monomer" and insert -- diamine monomer containing a pendant aliphatic chain --

Signed and Sealed this

Tenth Day of January, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,354,807
DATED : Oct. 11, 1994
INVENTOR(S) : MICHAEL DOCHNIAK

It is certified that error appears in the above—identified patent and that said Letters Patent is hereby corrected as shown below:

Title page, under Other Publications,
Second column, Christopher N. Ryan should be deleted and inserted therefor -- Christopher M. Ryan --.

Col. 11, line 2, delete "hydrophilic" and insert -- hydrophyilic --

Signed and Sealed this

Twenty-eight Day of March, 1995

Attest:

BRUCE LEHMAN

Attesting Officer

Commissioner of Patents and Trademarks